United States Patent Office 3,446,769
Patented May 27, 1969

3,446,769
HIGH SOLIDS COATING COMPOSITIONS
Anthony William Opipari, Detroit, Mich., assignor to Celanese Coatings Company, New York, N.Y., a corporation of Delaware
No Drawing. Filed Oct. 12, 1966, Ser. No. 586,027
Int. Cl. C08f 15/16; C09d 3/80
U.S. Cl. 260—31.4                    10 Claims

ABSTRACT OF THE DISCLOSURE

Thermosetting acrylic copolymer coating compositions which have high solids contents at application viscosities are made by dissolving the copolymer in a solvent, non-solvent, stabilizing solvent mixture. Such coating compositions are particularly useful as automotive top-coat enamels applied by spray operations.

---

This invention pertains to coating compositions which can be applied at high solids content. Specifically, this invention relates to acrylic copolymer coating compositions, and processes for preparing such compositions, which have high solids at application viscosities, these high solids being obtained by the utilization of particular solvents.

Industrial coatings, particularly automotive top coats, are generally applied by spraying. In spray applications, the viscosity of the paint is very important. A paint which has a high viscosity will not atomize properly when discharged from the spray gun. A coating made from a high viscosity paint will be uneven and will contain a surface roughness known as "orange peel." The viscosity of a paint can be lowered to proper application viscosity by the addition of more solvents which, obviously, lowers the solids content of the paint. Low solids content paints contain a low percentage of film forming constituents and require several passes with the spray gun and several coats to obtain proper film build-up. In addition, low solids content paints are uneconomical in that they contain a high percentage of solvents. Solvents do not become a part of the finished coating and are lost during application and drying.

Considerable effort has been expended by the paint industry to increase the solids content of paints while keeping the viscosity within the proper application limits. One approach to this problem has been the use of low molecular weight film forming components. The viscosities of solutions of polymers of the same type are generally directly proportional to the molecular weight of the polymers. A solution of a low molecular weight polymer will have a lower viscosity than the same concentration of the same type polymer at a higher molecular weight. A disadvantage of obtaining higher solids content paints by this technique is that the film properties of such lower molecular weight compositions are generally inferior to those obtained from higher molecular weight components.

High solids content paints have also been obtained by utilizing emulsions and dispersions of polymers. Emulsified and dispersed polymers have high molecular weights, but the emulsions and dispersions have low viscosities. Disadvantages of this approach to high solids are stability problems encountered in formulation and storage of the paint as well as problems in applying and repairing the coatings due to the insolubility of the applied coating in the dispersion or emulsion.

This invention proposes the preparation of paints having high solids contents at application viscosities by the utilization of solvents, non-solvents and stabilizing solvents. By this invention, high solids content coating compositions are prepared by polymerizing acrylic monomers in a solvent, adding to the polymer solution thus formed sufficient non-solvent to just precipitate the polymer from solution and then adding sufficient stabilizing solvent to just redissolve or disperse the polymer. The resulting compositions have viscosities which are lower than compositions of the same polymers dissolved at the same solids contents in a true solvent system. Paints which have high solids contents at application viscosities can be readily made from these compositions.

The compositions of this invention are advantageous in that low viscosities can be obtained without modifying the chemical nature or molecular weights of the polymers. Conventional acrylic polymer solutions, made by known processes and with known monomers and ratios of monomers, are used. These conventional polymer solutions are then modified by the incorporation of non-solvents and stabilizing solvents to yield low viscosities at given solids levels. The polymers themselves are not altered by this procedure but remain in the same chemical form as when initially polymerized. Coatings made from the polymer compositions of this invention have excellent physical and chemical resistance properties comparable to tried and tested coatings. These compositions, however, can be readily applied by spraying without encountering atomization difficulties. Paint films of the desired thickness can be applied in less time and with less coats. Since there is not as much solvent present in the paints, less solvent is utilized. Furthermore, less expensive solvents can be used in these compositions than in conventional compositions.

When acrylic polymers are dissolved in a solvent, the resulting solution has a viscosity which is intermediate between the viscosity of the solvent and of the polymer. The viscosity of the solution is dependent upon the molecular weight and chemical nature of the polymer, the type solvent and the concentration of the polymer in the solvent. For a particular polymer in a particular solvent at a constant temperature, the viscosity is directly dependent upon the concentration. As the concentration is gradually decreased by the addition of more solvent, the viscosity gradually decreases. When the concentration of the polymer in the solvent approaches zero, the viscosity of the solution approaches the viscosity of the solvent.

The viscosity-concentration relationship can be changed by the incorporation of a non-solvent with the polymer and solvent. When a non-solvent (an organic liquid in which the polymer is substantially insoluble but which is miscible with the solvent) is gradually added to the solution of polymer and solvent, the viscosity gradually decreases as long as the polymer remains dissolved. However, when sufficient non-solvent is added to just begin to precipitate the polymer from solution, as evidenced by clouding of the solution, the viscosity falls off sharply and approaches the viscosity of the solvent and non-solvent. At this point, the viscosity of the solvent, non-solvent and polymer is much lower than the viscosity of the polymer and solvent at the same concentration. This heterogeneous system is not particularly adaptable to use in the preparation of paints, however. The polymer which has precipitated from solution will settle out and will agglomerate. Solvent can be added back to redissolve the polymer and to form a stable clear solution. However, the use of solvents of the same type and kind as those in which the polymer was originally dissolved raises the viscosity sharply to the same viscosity-concentration relationship as experienced in the original polymer-solvent system. It has now been found that by the addition of small amounts of active solvents, which are called stabilizing solvents, the polymers can be redissolved or dispersed to form stable solutions or dispersions with no appreciable increase in viscosity. The polymer solutions or dispersions of polymer, solvent, non-solvent and stabilizing solvent have viscosities much lower than the polymer and solvent at the same concentration.

The compositions of this invention (solvent, non-solvent stabilizing solvent and polymer) appear to the eye to be solutions in that they are clear and contain no visible undissolved particles. In some respects, however, the compositions have the physical characteristics of dispersions. These characteristics are low viscosity, excellent flow properties and ease of atomization by a spray gun. In all likelihood, these compositions contain both solvated and molecularly colloidily dispersed portions and are intermediate between true solutions and the dispersions. For purposes of simplicity, the compositions will be referred to as solutions.

The polymers contemplated for use in this invention are film-forming acrylic copolymers made by polymerizing acrylic monomers in solution with a free radical producing catalyst. Particularly useful acrylic copolymers are those which contain functional groups and which are capable of being further reacted to form crosslinked, thermoset coatings and films, although high molecular weight acrylic polymers and copolymers free of functional groups can also be used.

The preferred acrylic copolymers that can be used in this invention are hydroxyl-carboxyl containing copolymers. These hydroxyl-carboxyl containing copolymers are copolymers of a polymerizable monoethylenically unsaturated acid, a beta hydroxyalkyl ester of a polymerizable monoethylenically unsaturated acid and at least one monoethylenically unsaturated monomer copolymerizable therewith. These copolymers contain about 0.15 to about 5 weight percent polymerizable acid and about 5 to about 50 weight percent hydroxyalkyl ester, the weight percentages being based upon the total weight of the copolymer.

Suitable polymerizable acids include acrylic acid, methacrylic acid, itaconic acid, crotonic acid and half esters of maleic and fumaric acid formed by esterifying one acid group of maleic or fumaric acid with a saturated alcohol containing one to ten carbon atoms.

The beta hydroxyalkyl esters of polymerizable acids include the beta hydroxyalkyl esters of the polymerizable acids described above. The preferred beta hydroxyalkyl esters are those which contain 2 to 4 carbon atoms in the alkyl group. Examples of these esters are beta hydroxyethyl acrylate, beta hydroxyethyl methacrylate, beta hydroxypropyl acrylate, beta hydroxypropyl methacrylate, beta hydroxybutyl crotonate, beta hydroxypropyl butyl maleate, beta hydroxypropyl ethyl fumarate and the like. Beta hydroxyalkyl esters can be made by reacting a monoepoxide compound with a polymerizable ethylenically unsaturated acid. Additional beta hydroxyalkyl esters useful in preparing the acrylic copolymers are made by reacting the polymerizable acids as hereinbefore described with such monoepoxides as ethylene oxide, 1,2 - propylene oxide, 1,2 - butylene oxide, 2,3 - butylene oxide, styrene oxide, phenyl glycidyl ether, butyl glycidyl ether and the like.

Other monomers that can be copolymerized with the hydroxyl and acid monomers are esters of acrylic and methacrylic acid with alkanols containing 1 to 12 carbon atoms, such as ethyl acrylate, methyl methacrylate, butyl acrylate, butyl methacrylate, 2 - ethylhexyl acrylate, lauryl methacrylate, benzyl acrylate, cyclohexyl methacrylate and the like. Additional monomers are acrylonitrile, methacrylonitrile, styrene, vinyl toluene, alpha-methyl styrene, methyl ethacrylate, and so forth. These monomers contain one polymerizable ethylenically unsaturated group and are devoid of hydroxyl groups and carboxyl groups.

In addition to the hydroxyl-carboxyl containing acrylic copolymers, copolymers which contain other functional groups capable of further reaction to give crosslinked products can also be utilized in this invention. Examples of these groups are alkoxylated methylol groups, amino groups and epoxy groups. Copolymers with these functional groups are obtained by copolymerizing such monomers as butoxymethyl acrylamide, methoxy methyl methacrylamide, glycidyl methacrylate, glycidyl acrylate, N-methyl aminomethyl methacrylate and the like with other monomers hereinbefore described.

The solvents in which the acrylic copolymers are first dissolved for use in this invention are aromatic hydrocarbons and oxygenated solvents (alcohols, esters, ketones and ether alcohols) having boiling points above about 225° F. Examples of these solvents are toluene, xylene, n-butanol, amyl alcohol, cyclohexanol, hexanol, amyl acetate, butyl acetate, diethylene glycol monobutyl ether acetate, ethylene glycol monobutyl ether acetate, diethylene glycol monoethyl ether acetate, ethylene glycol monoethyl ether acetate, 2-ethylhexyl acetate, cyclohexanone, di-isobutyl ketone, ethyl amyl ketone, ethyl butyl ketone, methyl isobutyl ketone, ethylene glycol methyl ether, propylene glycol methyl ether, di-propylene glycol methyl ether and the like. Additional solvents are the commercially available mixed aromatic hydrocarbons, such as Solvesso 100 [boiling range 312–432° F., refractive index 1.492 at 20° C., specific gravity 0.872 (60/60° F.)] and Solvesso 150 [boiling range 369–412° F., refractive index 1.5020 at 20° C., specific gravity 0.892 (60/60° F.)]. Mixtures of solvents can be used where necessary to obtain desired evaporation rates or other properties.

Non-solvents useful in this invention are alphatic and cycloaliphatic hydrocarbons having Kauri-Butanol values less than about 60, with the preferred Kauri-Butanol values being between about 20 and 50. Examples of these hydrocarbons are hexane, heptane, octane, iso-octane, mineral spirits, VM&P naphtha, turpentine, dipentene, alpha pinene and the like. These hydrocarbons contain 6 to about 20 carbon atoms in their structure. Mixtures of these hydrocarbons can also be used. The hydrocarbons that are used in this invention are completely miscible with the solvents, but do not dissolve the polymers to any appreciable extent.

The stabilizing solvents that are used in this invention are active polar solvents containing one to about five carbon atoms and having boiling point sbelow 225° F. Examples of such solvents are acetone, methyl ethyl ketone, methanol, ethanol, ethyl acetate, methyl acetate, isopropyl acetate and the like. These stabilizing solvents in the amounts used are miscible with the solvents and non-solvents and are excellent solvents for the acrylic polymers.

The solvents, non-solvents and stabilizing solvents are liquid at room temperature and at atmospheric pressure and contain no groups reactive with the acrylic monomers and polymers under polymerization conditions.

In preparing the compositions of this invention, the ratio of solvent to non-solvent to stabilizing solvent which is required to obtain the desired viscosity-solids relationship can be determined by dissolving the acrylic copolymer in a known amount of solvent, adding to the solution sufficient non-solvent to just begin to precipitate the copolymer from solution and then adding sufficient stabilizing solvent to just obtain a clear composition which contains no visible undissolved particles and from which no copolymer settles out upon standing. By measuring the amount of solvent, non-solvent and stabilizing solvent used, their weight ratio is readily determined. Acrylic copolymers of similar physical and chemical characteristics can be dissolved in the predetermined amounts of solvent, non-solvent and stabilizing solvent to form the compositions of this invention.

In practice, the ratio of solvent to non-solvent can be readily determined by viscosity measurements. In the paint and coatings industry, a common method for determining viscosity is by the use of the Ford Cup. This is an efflux-type viscometer and consists of a cup having an orifice in the bottom. The cup is filled with the material to be tested and is emptied by allowing the material to run through the orifice. The time for efflux is taken as a measure of the viscosity. This method can be used to determine the viscocity of pigmented as well as clear coating compositions. In carrying out this invention, viscosity of the acrylic copolymer and solvent is determined. Known amounts of non-solvent are added and the viscosity is measured. As the amount of added non-solvent increases, the viscosity decreases until the point of insolubilization is reached. Addition of non-solvent past this point causes the viscosity to increase. This increase is due to the formation of stringy, gummy polymer precipitate which impedes the flow of effluxing material from the Ford Cup, thereby giving a high viscosity value. The point of lowest viscosity indicates the maximum amount of non-solvent that can be added to the particular system being evaluated to obtain the optimum viscosity-solids relationship.

The ratio of the three liquid components, solvent, non-solvent and stabilizing solvent, will vary with the molecular weight and chemical class of the copolymer as well as the particular solvent, non-solvent and stabilizing solvent used. However, for any particular system, this ratio can be readily determined as hereinabove described. It has been found that about 40 to about 80 weight percent of the total solvent, non-solvent and stabilizing solvent components should be solvent with the remainder being non-solvent and stabilizing solvent in the weight ratio of about 3 to 9 parts of non-solvent to 1 part of stabilizing solvent with the preferred weight ratio being 3 to 5 parts of non-solvent to 1 part of stabilizing solvent.

The acrylic copolymer, solvent, non-solvent, stabilizing solvent compositions of this invention are particularly useful when compounded into paints and enamels. As stated hereinbefore, the preferred acrylic copolymers are those which contain functional groups and which are capable of being further reacted to form crosslinked, thermoset coatings. The most preferred acrylic copolymers are the hydroxyl-carboxyl containing copolymers. These hydroxyl-carboxyl containing copolymers are reacted with aminoplast resins to obtain crosslinked thermoset films. The aminoplast resins are the reaction products of urea, N,N'-ethyleneurea, dicyandiamide, and aminotriazines with an aldehyde and an alcohol having 1 to about 8 carbon atoms.

Among the triazines which are suitable are melamine, acetoguanamine, benzoguanamine, N-(t-butyl)-melamine and the like. Various aldehydes, such as acetaldehyde, acrolein and crotonaldehyde, can be used. However, the preferred aldehyde is formaldehyde and the formaldehyde producing polymers- paraformaldehyde and trioxane.

Suitable alcohols for use in alkylating the aminoplast resins are methanol, ethanol, isopropanol, n-butanol, iso-butanol, hexanol, 2-ethyl-hexanol and the like.

The hydroxyl-carboxyl containing copolymers and aminoplast resins are mixed and reacted in the weight ratios of about 50 to 90 parts copolymer to 50 to 10 parts aminoplast resins. Films prepared from the mixtures can be cured to the thermoset state by heating at temperatures within the range of about 175° F. to about 350° F. for 15 minutes to 1 hour.

Any of the well known paint pigments, fillers and extenders can be used to form the paints and enamels of the desired color. Examples of such pigments are titanium dioxide, lamp black, red oxide, phthalocyanine blue, aluminum powder, yellow iron oxide, umber, sienna, indanthrone blue, thio indigos, etc., as well as the various silicates, diatomaceous earths, etc., which are used to modify paint compositions.

In the automotive industry, the enamels are classed as being metallics and non-metallics. Metallic enamels are made with aluminum powder as the hiding pigment, and the non-metallics contain titanium dioxide as the hiding pigment. Relatively small amounts of pigments are used with the metallic enamels compared to the non-metallics in order to obtain the desired "metallic" appearance in the finished enamel. Because of this difference in formulation, metallic enamels must be applied at a lower solids content than the non-metallics. Conventional thermosetting acrylic metallic enamels, which are made in conventional solvents, have a #4 Ford Cup viscosity of 30 seconds at 39% solids. In order that these enamels can be properly applied, the viscosity must be reduced by the addition of solvents to 17 seconds. The solids are reduced to 30%. Non-metallics using conventional solvents have package viscosities of 30 seconds at 50% solids and application viscosities of 17 seconds at 40 to 41% solids.

The compositions of this invention using solvents, non-solvents and stabilizing solvents have, for the metallic enamels, package viscosities of 22–23 seconds at 39% solids and at 17 seconds, the conventional application viscosity, the solids are 33%. However, these compositions due to improved flow and atomization characteristics can be applied at a viscosity of 20 seconds and a solids content of 36%. The non-metallic enamels also have improved viscosity-solids relationships. These have been made having package viscosities of 22 seconds at 54% solids and viscosities at 17 seconds of 46–47%. However, the non-metallic enamels can also be applied at a viscosity of 20 seconds at which point the solids are 49–50%.

In tabular form, these improvements are as follows:

VISCOSITY-SOLIDS RELATIONSHIP

|  | Package Viscosity #4 Ford Cup | Package Solids Percent Non-Volatile | Solids at 17 seconds #4 Ford Cup Viscosity | Application Solids (Viscosity) |
| --- | --- | --- | --- | --- |
| Standard Non-Metallic Acrylic Enamel | 30 seconds | 50 | 40-41 | 40-41 (17 sec.) |
| Improved Non-Metallic Acrylic Enamel | 22 seconds | 54 | 46-47 | 49-50 (20 sec.) |
| Standard Metallic Acrylic Enamel | 30 seconds | 39 | 30 | 30 (17 sec.) |
| Improved Metallic Acrylic Enamel | 22-23 seconds | 39 | 33 | 36 (20 sec.) |

The following examples illustrate several embodiments of this invention. Parts and percentages are by weight unless otherwise stated.

COPOLYMER A

To a suitable reaction vessel equipped with an agitator, thermometer, inlet tube and reflux condenser are added 67 parts of ethylene glycol monoethyl ether acetate. To a second container are added 46.9 parts of n-butyl methacrylate, 37.35 parts of styrene, 14.42 parts of 2-hydroxypropyl methacrylate, 1.33 parts of methacrylic acid and 2 parts of cumene hydroperoxide. After throughly mixing these monomers and catalyst, 10 parts of the monomer-catalyst solution are added to the reaction vessel. Heat is applied raising the temperature of the reactants to 280° F. in about one hour. The remaining monomer-catalyst solution is then introduced into the reaction vessel over a 45-minute period while holding the temperature at 275° F. to 285° F. The temperature is held within this range for about two hours until substantially complete conversion of monomers to polymers is obtained. The resulting acrylic copolymer solution has a Gardner-Holdt viscosity at 25° C. or $Z_2$ to $Z_3$ (55% solids) and an acid value on solids basis of 4 to 6.

COPOLYMER B

Using the same porcedure as described in preparing Copolymer A, an acrylic copolymer solution is made from 25 parts of n-butyl methacrylate, 27.9 parts of n-butyl acrylate, 17.9 parts of methyl methacrylate, 10 parts of styrene, 17.2 parts of 2-hydroxypropyl methacrylate and 2 parts of methacrylic acid in 67 parts of ethylent glycol monoethyl ether acetate. This solution has a Gardner-Holdt viscosity of $Z_3$ to $Z_4$ at 60% solids in ethylene glycol monoethyl ether acetate and an acid value on solids basis of 12–14.

COPOLYMER C

Using the same procedure as described under Copolymer A, an acrylic copolymer solution is prepared from 18.0 parts of n-butyl methacrylate, 27.9 parts of n-butyl acrylate, 22.9 parts of methyl methacrylate, 12.0 parts of styrene, 17.2 parts of hydroxypropyl methacrylate and 2 parts of metracrylic acid in 67 parts of ethylene glycol monoethyl ether acetate. The resulting acrylic copolymer solution when reduced to 55% solids with ethylene glycol monoethyl ether acetate has a Gardner-Holdt viscosity at 25° C. of P-Q and an acid value on solids basis of 12–14.

AMINOPLAST RESIN A

To a suitable reactor are added a mixture containing 116.6 parts n-butanol, 43.7 parts formaldehyde and 21 parts water. The pH is adjusted to 4.2 to 4.5 and 32.4 parts of melamine are added. The temperature is raised to 195–200° F. and is held at this temperature until the melamine dissolves, about 30 minutes time. The pH is then raised to 7.3–7.5 with sodium hydroxide and heating is continued at 195–200° F. for one hour. The temperature is then raised to 206° F. where water-butanol azeotropic distillation begins. The water of distillation is removed and the butanol is returned to the reactor. The distillation is continued for two hours. The pH is then adjusted to 6.0–6.2 with formic acid. Azeotropic distillation is continued for five hours at which time the free formaldehyde content is less than 5%. The reactants are then heated under 10 inch Hg pressure at 200° F. to remove butanol and water and to body the reactants. Heating is continued until a Gardner-Holdt viscosity at 25° C. of U–W is obtained. The resulting product is then thinned with butyl acetate to 65% solids.

EXAMPLE 1

One hundred parts of a solution of Copolymer C is made up at 55% solids in ethylene glycol monoethyl ether acetate. The viscosity as measured by a #4 Ford Cup at 25° C. is 3 minutes, 16.4 seconds. The solution is reduced to 45% solids by the addition of 22 parts V.M. & P. naphtha. The viscosity is lowered to 52.2 seconds. By further addition of V.M. & P. naphtha, the solids content of the solution is lowered to 40% and the viscosity to 28.5 seconds. When reduced to 35% solids with the same non-solvent, the viscosity is 26.5 seconds and a resin precipitate begins to form. Upon further addition of non-solvent to 30% solids, the viscosity rises to 37.5 seconds. Addition of about 10 parts of acetone to the 35% solids solution produces a clear stable composition.

EXAMPLE 2

Using the same procedure as described in Example 1, a solution (100 parts) of Copolymer C is made up at 50% solids in ethylene glycol monoethyl ether acetate. V.M. & P. naphtha is added to reduce the solids, giving the following results:

| Percent Solids: | Viscosity | Remarks |
|---|---|---|
| 45 | 54 seconds |  |
| 40 | 24.6 seconds |  |
| 35 | 19.3 seconds | Precipitate Forming. |
| 30 | 17.5 seconds |  |
| 25 | 35.4 seconds |  |

The addition of about 10 parts of acetone to the 30% solids solution produces a clear, stable composition.

EXAMPLE 3

Using the same procedures as described in Example 1, a series of acrylic copolymer compositions are made from Copolymer C, ethylene glycol monoethyl ether acetate (solvent) and V.M. & P. naphtha (non-solvent), and the viscosities are determined. The relationships of solids content, viscosity and solvent and non-solvent are as follows:

| Percent Solids | Percent Solvent in Volatiles | Percent Non-Solvent in Volatiles | Viscosity, seconds |
|---|---|---|---|
| 45 | 82 | 18 | 54 |
| 45 | 67 | 33 | 52.2 |
| 45 | 55 | 45 | 68.7 |
| 40 | 81.5 | 18.5 | 32.5 |
| 40 | 66.6 | 33.4 | 24.6 |
| 40 | 54.5 | 45.5 | 28.5 |
| 40 | 44.5 | 55.5 | 54.8 |
| 35 | 81 | 19 | 21.6 |
| 35 | 66 | 34 | 20.5 |
| 35 | 54 | 46 | 19.3 |
| 35 | 44 | 56 | 26.5 |
| 35 | 36 | 64 | 54.8 |
| 30 | 64.5 | 35.5 | 16.0 |
| 30 | 52.4 | 47.6 | 15.3 |
| 30 | 42.8 | 57.2 | 17.5 |
| 30 | 35 | 65 | 37.5 |

The viscosity at 45% solids is too high for practical application in the paint compositions of this invention.

At 40% solids, the useful viscosities are 24 to 28 seconds in which the weight percent solvent in the total volatiles is 67 to 54%.

At 35% solids, the weight percent solvent in the total volatiles in the useful compositions varies from about 44% to about 80%. At 30% solids, this variation of solvent is 42% to at least 65%.

EXAMPLE 4

A blue metallic automotive enamel is prepared by mixing 40.56 parts of Copolymer A (60% solids in ethylene glycol monoethyl ether acetate) with 1.00 part of phthalocyanine blue pigment, and grinding the mixture until a smooth dispersion is obtained. 0.54 part non-leafing aluminum pigment, 6.50 parts toluene and 6.50 parts ethylene glycol monoethyl ether acetate are added to the grind and are thoroughly mixed. 5 parts acetone, 19.69 parts N.M. & P. naphtha and 20.21 parts of Aminoplast Resin A (65% solids in 35/65 butanol/butyl acetate) are then added and again are thoroughly mixed. The resulting paint has a viscosity (#4 Ford Cup at 77° F.) of 22 seconds at 39% solids. This paint is reduced to application viscosity of 20 seconds and a solids content of 36% by the addition of 6.64 parts of V.M. & P. and 1.66 parts of toluene.

This paint is sprayed on steel panels by conventional automotive spray techniques. Excellent atomization of the paint is observed. The paint on the panels exhibits excellent film build and is very smooth. The painted panels are baked for 30 minutes at 250° F. The resulting well cured coatings have a high gloss and an excellent appearance.

The same formulation is made in which the ethylene glycol, V.M. & P. naphtha and acetone are replaced with xylene. The resulting paint has a viscosity of 30 seconds at 39% solids. This paint is reduced to 20 seconds viscosity by the addition of xylene. Attempts to spray the paint at this viscosity result in poor atomization and coatings which are very uneven and rough. In order to obtain a sprayable paint, the viscosity is reduced to 17 seconds with the solids being reduced to 30%. Panels are sprayed with this standard paint using the same conditions that were used with the improved paint of this invention. The coatings from the standard paint had less film build than the coating from the improved paint (as much as 0.5 mil less) and were not as smooth and glossy.

EXAMPLE 5

A white non-metallic enamel is prepared by mixing 41.17 parts of Copolymer C (60% solids in ethylene glycol monoethyl ether acetate) with 16.12 parts of titanium dioxide, 0.05 part of lamp black and 0.05 part of red oxide and grinding the mixture to obtain a smooth dispersion. To the grind are added 4.43 parts of acetone and 17.72 parts of V.M. & P. naphtha. When thoroughly mixed, 20.56 parts of Aminoplast Resin A (65% solids in 35/36 butanol/butyl acetate) are added and thoroughly mixed. The resulting paint has a viscosity of 54% solids of 23 seconds. The paint is reduced to application viscosity of 20 seconds and a solids content of 50% by the addition of 6.4 parts of V.M. & P. naphtha and 1.6 parts by toluene.

This paint is sprayed on steel panels by conventional automotive spray techniques. Excellent atomization of the paint is observed. The paint on the panels exhibits excellent film build and very little "orange peel." The painted panels are baked for 30 minutes at 250° F. The resulting well cured coatings are smooth and glossy.

The same formulation is made in which the ethylene glycol monoethyl ether acetate, V.M. & P. naphtha and acetone are replaced with xylene. The resulting paint has a viscosity of 30 seconds at 50% solids. When reduced to 20 seconds viscosity with xylene, the paint cannot be properly sprayed due to atomization difficulties. Reduction to 17 seconds viscosity and 40% solids is necessary to obtain a paint which atomizes properly. The coatings on the panels from this paint have less film build than the coatings applied in the same manner using the improved paint of this example.

EXAMPLE 6

Using the same formulation as described in Examples 4 and 5, metallic and non-metallic enamels are made with Copolymer A in place of Copolymers B and C. The non-metallic paint at 54% solids has a viscosity of 23 seconds, has an application viscosity of 20 seconds at 50% solids and when reduced to 17 seconds viscosity, has a solids content of 47%.

The metallic paint at 39% solids has a viscosity of 22 seconds, an application viscosity of 20 seconds at 36% solids and when reduced to 17 seconds viscosity, has a solids content of 33%.

Excellent paint films are prepared by spraying the paints on steel panels at the application viscosity of 20 seconds. The films are well cured after being baked for 30 minutes at 250° F. They exhibit excellent film build and are very smooth and glossy.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing coating compositions having a low viscosity and a high solids content which comprises:
   (a) dissolving a film-forming acrylic copolymer in a solvent;
   (b) adding to the solution thus formed sufficient non-solvent to just begin to precipitate the copolymer from solution; and
   (c) adding sufficient stabilizing solvent to just place the copolymer back in solution,
wherein the acrylic copolymer is a copolymer of 0.15 to 5 weight percent of a polymerizable monoethylenically unsaturated carboxylic acid, 5 to 50 weight percent of a beta-hydroxyalkyl ester of a polymerizable monoethylenically unsaturated carboxylic acid and another monomer polymerizable therewith,
wherein the solvent is an aromatic hydrocarbon or oxygenated solvent having a boiling point above about 225° F.,
wherein the non-solvent is an aliphatic hydrocarbon or cycloaliphatic hydrocarbon having a Kauri-Butanol value below about 60, and
wherein the stabilizing solvent is an active polar solvent having a boiling point below about 225° F. and containing one to five carbon atoms.

2. The process of claim 1 wherein the polymerizable monoethylenically unsaturated carboxylic acid is methacrylic acid, wherein the beta-hydroxyalkyl ester of a polymerizable monoethylenically unsaturated carboxylic acid is beta-hydroxypropyl methacrylate and wherein the monomer polymerizable therewith is styrene, butyl acrylate, butyl methacrylate, methyl methacrylate or mixtures thereof.

3. A process for preparing coating compositions having a low viscosity and a high solids content which comprises carrying out the process of claim 1, measuring the amount of solvent, non-solvent and stabilizing solvent used, determining the ratio of solvent to non-solvent to stabilizing solvent, forming a solution of the solvent, non-solvent and stabilizing solvent in the predetermined ratio and dissolving the acrylic copolymer in the solution.

4. The process of claim 3 wherein 40 to 80 weight percent of the total solvent, non-solvent and stabilizing solvent is solvent with the remainder being non-solvent and stabilizing solvent in the weight ratio of 3 to 9 parts of non-solvent to 1 part of stabilizing solvent.

5. The process of claim 4 wherein the solvent is ethylene glycol monoethyl ether acetate, the non-solvent is V.M. & P. naphtha and the stabilizing solvent is acetone.

6. An acrylic copolymer composition which comprises a solution of an acrylic copolymer in a miscible mixture of solvent, non-solvent and stabilizing solvent,
wherein 40 to 80 weight percent of the total solvent, non-solvent and stabilizing solvent is solvent with the remainder being non-solvent and stabilizing solvent in the weight ratio of 3 to 9 parts of non-solvent to 1 part of stabilizing solvent,
wherein the acrylic copolymer is a copolymer of 0.15 to 5 weight percent of a polymerizable monoethylenically unsaturated carboxylic acid, 5 to 50 weight percent of a beta-hydroxyalkylester of a polymerizable monoethylenically unsaturated carboxylic acid and another monomer polymerizable therewith,
wherein the solvent is an aromatic hydrocarbon or oxygenated solvent having a boiling point above about 225° F.,
wherein the non-solvent is an aliphatic hydrocarbon or cycloaliphatic hydrocarbon having a Kauri-Butanol value below about 60 and
wherein the stabilizing solvent is an active polar solvent having a boiling point below about 225° F. and containing one to five carbon atoms.

7. A paint which comprises the composition of claim 6, an aminoplast resin and pigments wherein the acrylic copolymer and aminoplast resin are in the weight proportions of 90 to 50 parts of acrylic copolymer to 10 to 50 parts of aminoplast resin, the total being 100.

8. The composition of claim 7 wherein the aminoplast resin is an alkoxylated melamine-formaldehyde resin.

9. The composition of claim 7 wherein the weight ratio of non-solvent to stabilizing solvent is 3 to 5 parts of non-solvent to 1 part of stabilizing solvent.

10. The composition of claim 7 wherein the solvent is ethylene glycol monoethyl ether acetate, the non-solvent is V.M. & P. naphtha and the stabilizing solvent is acetone.

References Cited

UNITED STATES PATENTS

| | | | |
|---|---|---|---|
| 2,934,510 | 4/1960 | Crissey et al. | 260—31.2 |
| 3,082,184 | 3/1963 | Falgiatore et al. | |
| 3,179,617 | 4/1965 | Moore | 260—33.4 |
| 3,262,919 | 7/1966 | Bolgiano | 260—33.4 |
| 3,352,806 | 11/1967 | Hicks | 260—34.2 |

ALLAN LIEBERMAN, *Primary Examiner.*

L. T. JACOBS, *Assistant Examiner.*

U.S. Cl. X.R.

260—31.2, 33.2, 33.6, 34.2